J. M. VAN HEUSEN.
COMBINATION GARMENT.
APPLICATION FILED OCT. 10, 1912.
1,182,866.
Patented May 9, 1916.
5 SHEETS—SHEET 1.
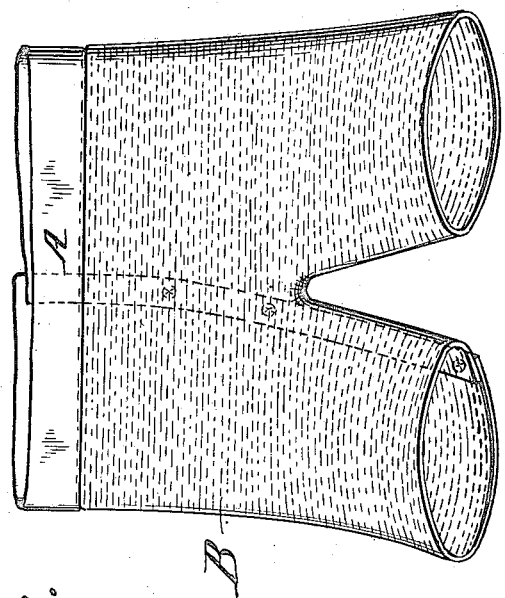
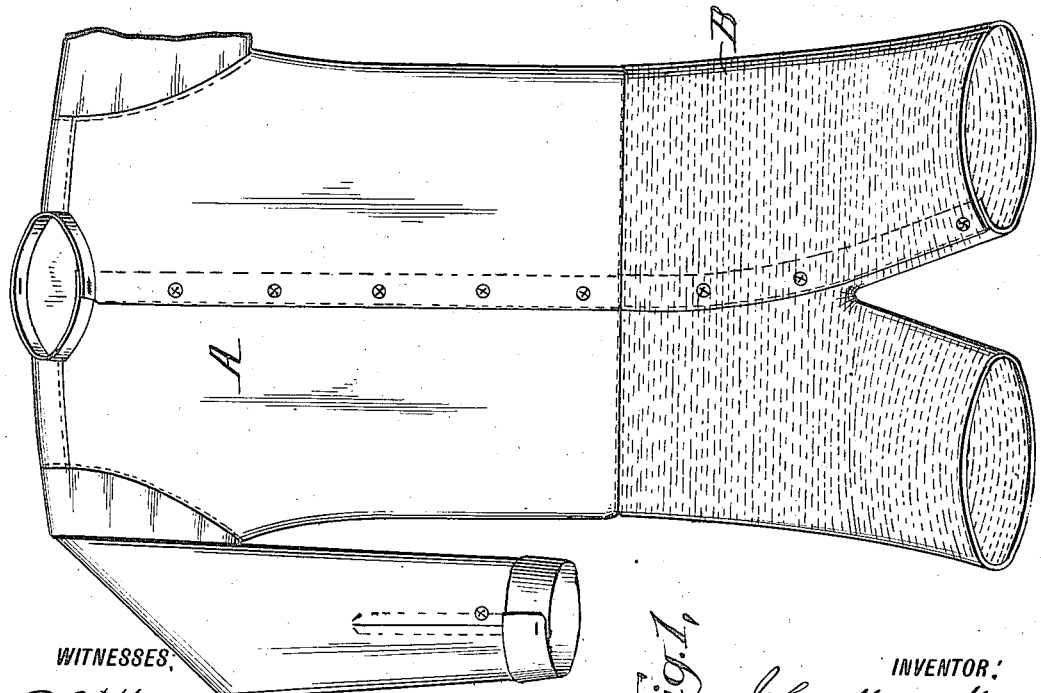
WITNESSES:
INVENTOR:
BY
ATTORNEYS.

J. M. VAN HEUSEN.
COMBINATION GARMENT.
APPLICATION FILED OCT. 10, 1912.
1,182,866.
Patented May 9, 1916.
5 SHEETS—SHEET 2.
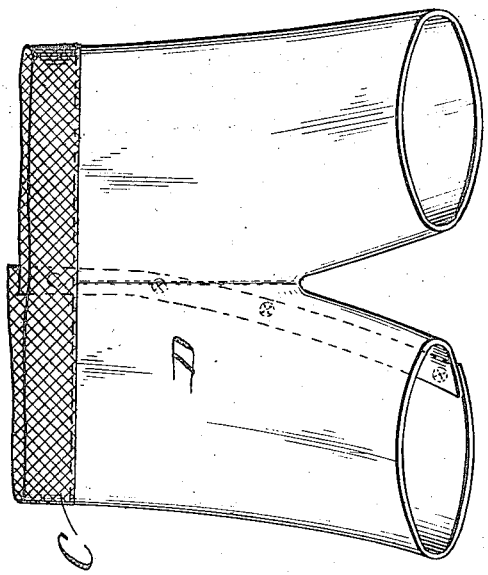
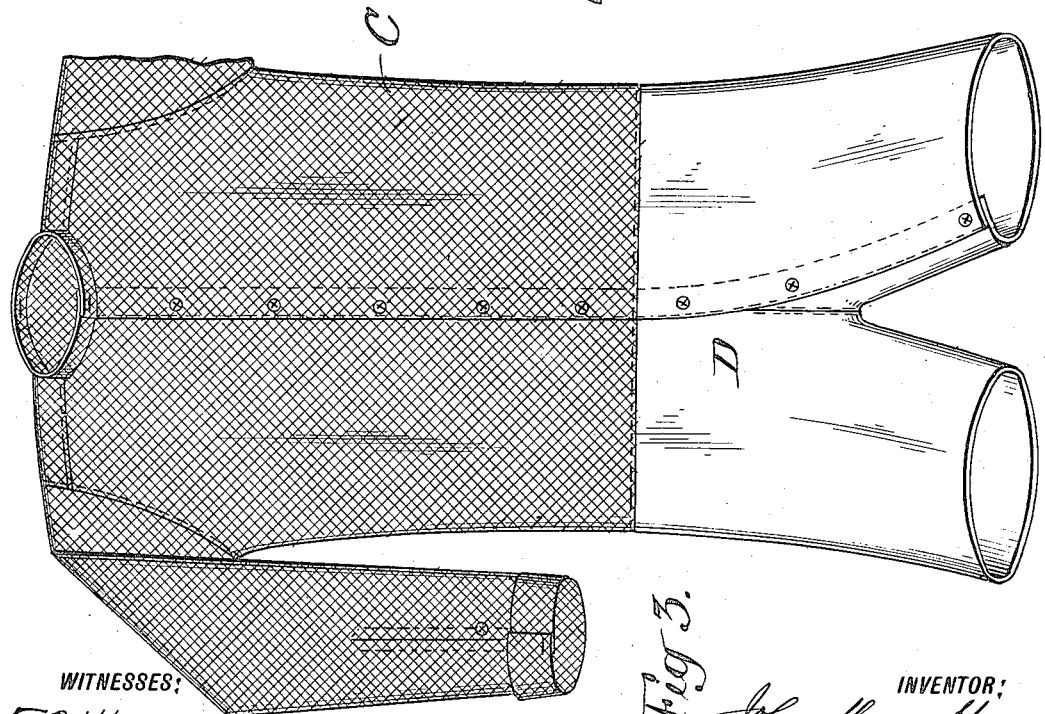

J. M. VAN HEUSEN.
COMBINATION GARMENT.
APPLICATION FILED OCT. 10, 1912.

1,182,866.

Patented May 9, 1916.
5 SHEETS—SHEET 3.

J. M. VAN HEUSEN.
COMBINATION GARMENT.
APPLICATION FILED OCT. 10, 1912.
1,182,866.
Patented May 9, 1916.
5 SHEETS—SHEET 4.
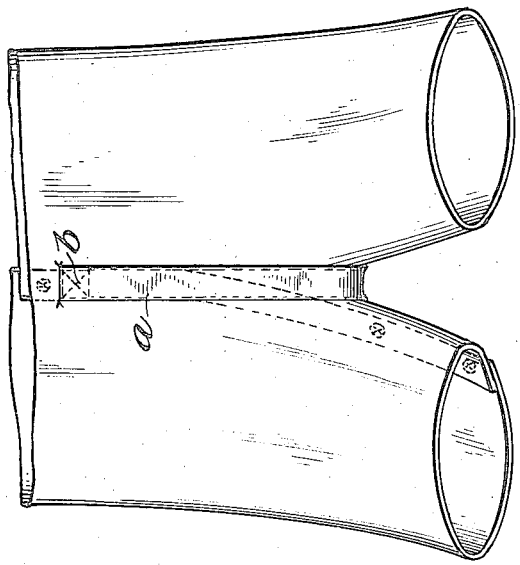
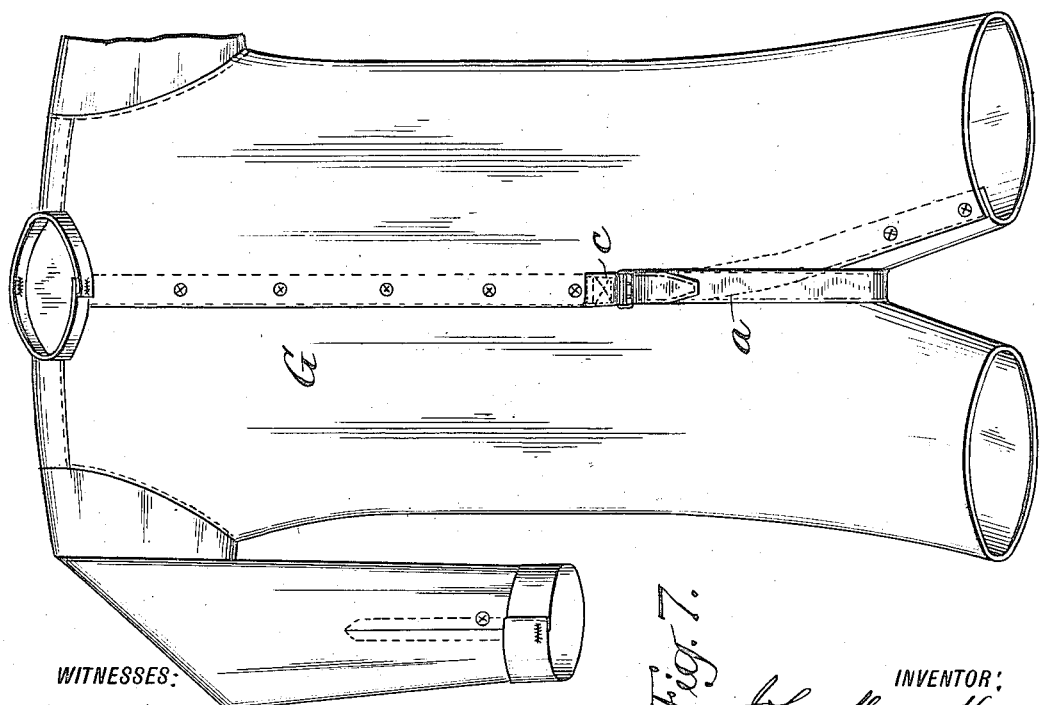

J. M. VAN HEUSEN.
COMBINATION GARMENT.
APPLICATION FILED OCT. 10, 1912.
1,182,866.
Patented May 9, 1916.
5 SHEETS—SHEET 5.
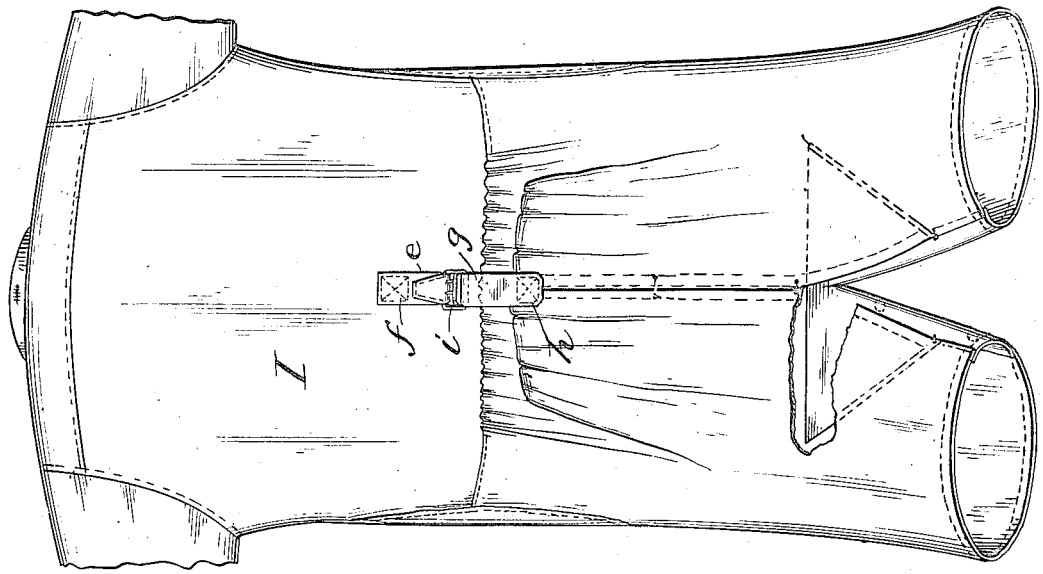
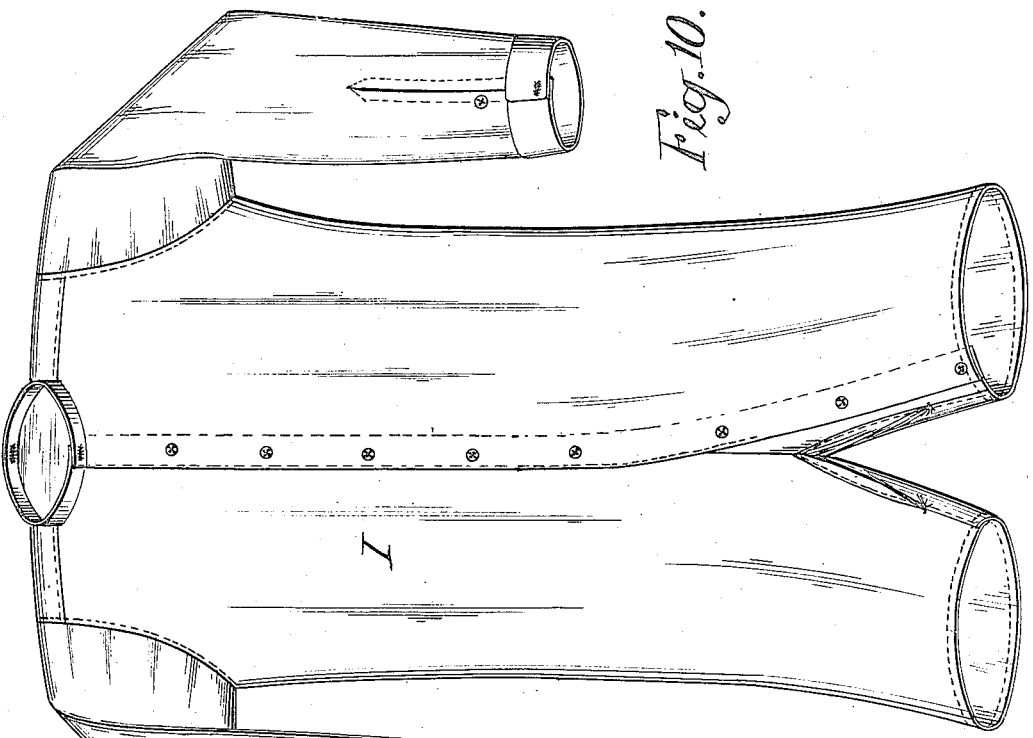
WITNESSES:
INVENTOR:
BY
ATTORNEYS.

UNITED STATES PATENT OFFICE.

JOHN M. van HEUSEN, OF BOSTON, MASSACHUSETTS, ASSIGNOR TO INNOVATION SHIRT COMPANY, OF NEW YORK, N. Y., A CORPORATION OF NEW YORK.

COMBINATION-GARMENT.

1,182,866.  Specification of Letters Patent.  Patented May 9, 1916.

Application filed October 10, 1912. Serial No. 724,911.

*To all whom it may concern:*

Be it known that I, JOHN M. VAN HEUSEN, a citizen of the United States, residing at Boston, county of Suffolk, State of Massachusetts, have invented certain new and useful Improvements in Combination-Garments; and I do hereby declare the following to be a full, clear, and exact description of the invention, such as will enable others skilled in the art to which it appertains to make and use the same.

In an application for Letters Patent of the United States, filed by me under date of October 22, 1912, Ser. No. 727,102, I have shown and described a combination garment having a closed seat and crotch portion and having separable fastenings extending longitudinally of the garment.

Figure 6:
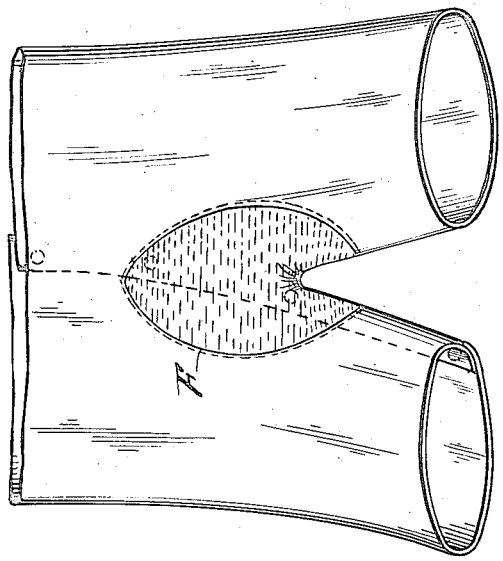
Figure 5:
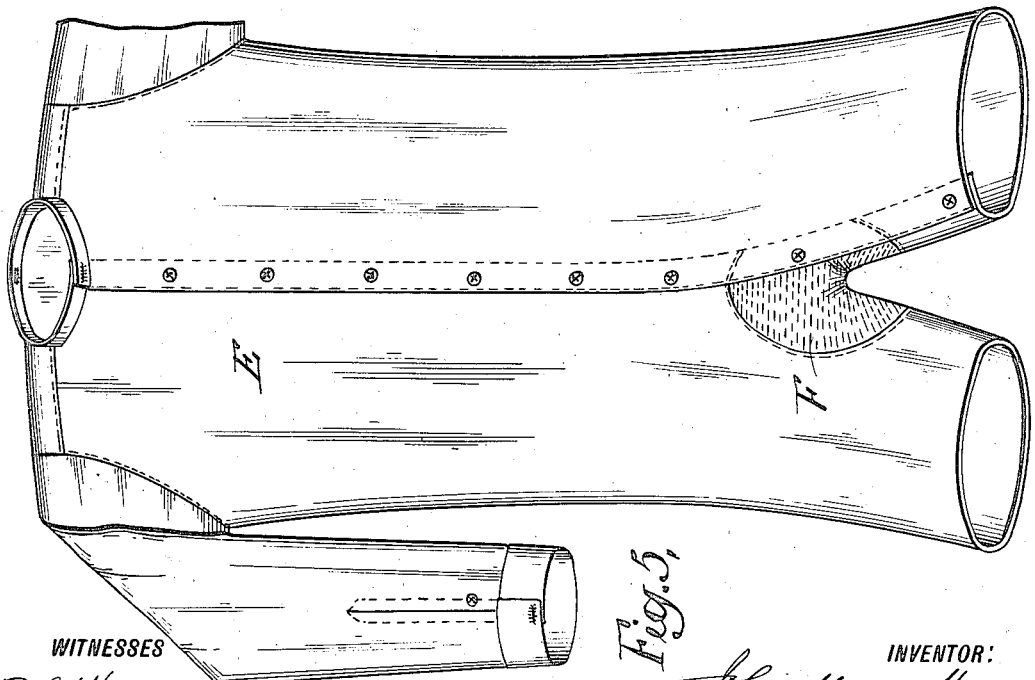

For general purposes, it is preferable to make such a garment of fabric of one kind; that is to say, of the same fabric throughout. In some instances, however, for particular uses and at particular seasons of the year, it will be desirable to have the upper or shirt portion of knit or other like elastic material, and the drawers portion of linen, or like relatively inelastic material. So also, in other instances, it may be preferred to reverse this arrangement and have the upper or shirt portion of linen or the like, and the lower or drawers portion of knit or other elastic fabric. Again, in certain instances, it may be desired to insert in the garment, if made of linen or the like, an elastic crotch piece of knitted goods, or a like elastic waist band. Again, it may be found desirable, especially in stock goods, not made to order, to provide means for adjusting the fit, so as to make the garment more comfortable to the wearer. These several contingencies are provided for in the construction shown in the accompanying drawings, wherein, Figure 1 represents a front view of a garment made in accordance with my invention with the upper or main body portion of linen or other tightly woven fabric and the lower or leg portions of knitted fabric; Fig. 2 represents a rear view thereof; Figs. 3, 4, represent views similar respectively to Figs. 1, 2, except that they illustrate the upper or main body portion of the garment as made of knitted fabric and the lower or leg portion as made of tightly woven fabric; Figs. 5, 6, represent views similar to Figs. 1, 2, but show the garment as made up of a woven fabric, except for the crotch piece which is of knitted fabric; Figs. 7, 8, show views similar to Figs. 1, 2 respectively, except that they illustrate the garment as made up of woven fabric with means for effecting the adjustment hereinbefore referred to; Figs. 9, 10 represent front and rear views of a garment, provided with means for obtaining an adjustment of the rear seat portion thereof.

Similar letters of reference indicate similar parts throughout the several views.

Referring to Figs. 1, 2, of the drawings, it will be noted that the upper or main body portion A is made of a tightly woven fabric, such as linen, or the like, and that the leg portion B is made up of a knitted fabric as indicated in Fig. 2, the seat portion as well as the crotch portion are completely closed.

In the garment shown in Figs. 3, 4, the upper or main body portion C is made of a knitted fabric and the leg portion D of a woven fabric, such as linen, the construction being otherwise the same as in the construction shown in Figs. 1 and 2.

In the form shown in Figs. 5 and 6, the garment E is shown as made of a woven fabric throughout, with the exception of the crotch piece F which is made of knitted fabric.

In the construction shown in Figs. 7 and 8, the garment G is shown as made throughout of a woven fabric, such as linen, or the like. In order to adjust the garment, a strip of fabric $a$ is provided, which is attached to the rear of the garment at the point $b$ and is adapted to extend between the two leg portions. It coöperates with a buckle $c$ attached to the front of the garment, so that by appropriate adjustment, any slack may be taken up.

In the garment I shown in Figs. 9 and 10, a strip of fabric $e$ is secured to the back of the garment at $f$ and another strip of fabric $g$ is secured to the seat portion at $h$. By means of the buckle $i$ with which these straps are adjustably connected, it is feasible to take up and adjust excess of slack in the seat portion.

It is, of course, evident that the adjustments contemplated in the garments shown in Figs. 7, 8, 9 and 10 may be applied to any of the garments shown in the remaining figures of the drawings.

Having thus described my invention what I claim is:

1. A combination garment having a closed seat, a closed crotch and secured from top to bottom by separable fastenings, said garment consisting in part of woven fabric, such as linen or the like, and in part of a knitted fabric; substantially as described.

2. A combination garment having a closed seat, a closed crotch and secured from top to bottom by separable fastenings, said garment being provided with means for slack adjustment; substantially as described.

3. A combination garment having a closed seat, a closed crotch and secured from top to bottom by separable fastenings, said garment being provided with means for slack adjustment, said means comprising a strip of fabric attached to the rear of the garment and extending between two leg portions together with a buckle attached to the front of the garment for engagement with said fabric strip; substantially as described.

4. A combination garment having a closed seat, a closed crotch, and secured from top to bottom by separable fastenings, said garment consisting in part of woven fabric, such as linen or the like, and in part of a knitted fabric, and said garment being provided with means for slack adjustment; substantially as described.

5. A combination garment having a closed seat, a closed crotch and secured from top to bottom by separable fastenings, said garment consisting of woven fabric, such as linen or the like, from near the waist line to one end thereof, and of a knitted fabric from near the waist line to the other end thereof; substantially as described.

In testimony whereof I affix my signature, in presence of two witnesses.

JOHN M. van HEUSEN.

Witnesses:
 ALFRED WALLENSTEIN,
 CAROLINE R. SINGLER.